United States Patent
Balasubramanian et al.

(10) Patent No.: US 12,449,872 B2
(45) Date of Patent: Oct. 21, 2025

(54) NETWORK FABRIC POWER MANAGEMENT

(71) Applicant: Apple Inc., Cupertino, CA (US)

(72) Inventors: Srikanth Balasubramanian, Los Altos, CA (US); Anwar Q. Rohillah, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/459,250

(22) Filed: Aug. 31, 2023

(65) Prior Publication Data
US 2025/0076948 A1 Mar. 6, 2025

(51) Int. Cl.
*G06F 1/26* (2006.01)
(52) U.S. Cl.
CPC ................................ *G06F 1/266* (2013.01)
(58) Field of Classification Search
CPC ... G06F 1/32; G06F 1/26; G06F 1/266; G06F 115/02; G06F 13/14
See application file for complete search history.

(56) References Cited

U.S. PATENT DOCUMENTS

| | | | |
|---|---|---|---|
| 6,654,946 B1 | 11/2003 | Eneboe et al. | |
| 6,792,584 B1 | 9/2004 | Eneboe et al. | |
| 2006/0053324 A1* | 3/2006 | Giat | H04L 12/10 713/300 |
| 2007/0081414 A1 | 4/2007 | Douady et al. | |
| 2007/0240006 A1* | 10/2007 | Fung | G06F 1/32 713/323 |
| 2018/0267595 A1* | 9/2018 | Nampoothiri | G06F 1/3225 |
| 2019/0041960 A1* | 2/2019 | Guim Bernat | H04L 41/5051 |

(Continued)

FOREIGN PATENT DOCUMENTS

| | | |
|---|---|---|
| KR | 10-2015-0019457 A | 2/2015 |
| KR | 10-2022-0143590 A | 10/2022 |
| WO | 2015013032 A1 | 1/2015 |

OTHER PUBLICATIONS

International Search Report and Written Opinion in PCT Appl. No. PCT/US2024/038829 mailed Oct. 30, 2024, 9 pages.

(Continued)

*Primary Examiner* — Jaweed A Abbaszadeh
(74) *Attorney, Agent, or Firm* — Kowert, Hood, Munyon, Rankin & Goetzel, P.C.; Scott W. Pape; Dean M. Munyon

(57) ABSTRACT

An apparatus includes a system-on-chip that includes a plurality of agents configured to generate data transactions, a communication network configured to transfer transactions between two or more of the agents, a plurality of network switches, and a bandwidth regulation circuit. The network switching circuits may be coupled to the agents and to the network. One of the network switches may be configured to estimate a bandwidth need for transactions to be sent via the network switch in an upcoming window. The bandwidth regulation circuit may be configured to moderate power consumption of the network by determining a bandwidth budget using a network power budget for the upcoming time window, and determining a global bandwidth forecast using estimated bandwidth needs received from the network switches. The bandwidth regulation circuit may also be configured to allocate, using the global bandwidth forecast, the bandwidth budget among the network switches.

20 Claims, 10 Drawing Sheets

(56) References Cited

U.S. PATENT DOCUMENTS

| | | |
|---|---|---|
| 2019/0101974 A1 | 4/2019 | Guim Bernat |
| 2022/0100247 A1* | 3/2022 | Garg .................. G06F 1/324 |
| 2022/0124043 A1 | 4/2022 | Zhu et al. |
| 2022/0179797 A1 | 6/2022 | Swanson et al. |

OTHER PUBLICATIONS

Yehya Nasser et al., "Dynamic power estimation based on switching activity propagation," 2017 27th International Conference on Field Programmable Logic and Applications (FPL), pp. 1-2, Sep. 9, 2017 (sections II-III).

* cited by examiner

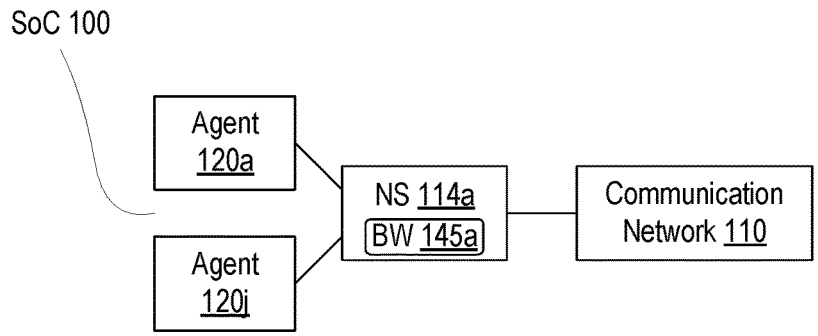
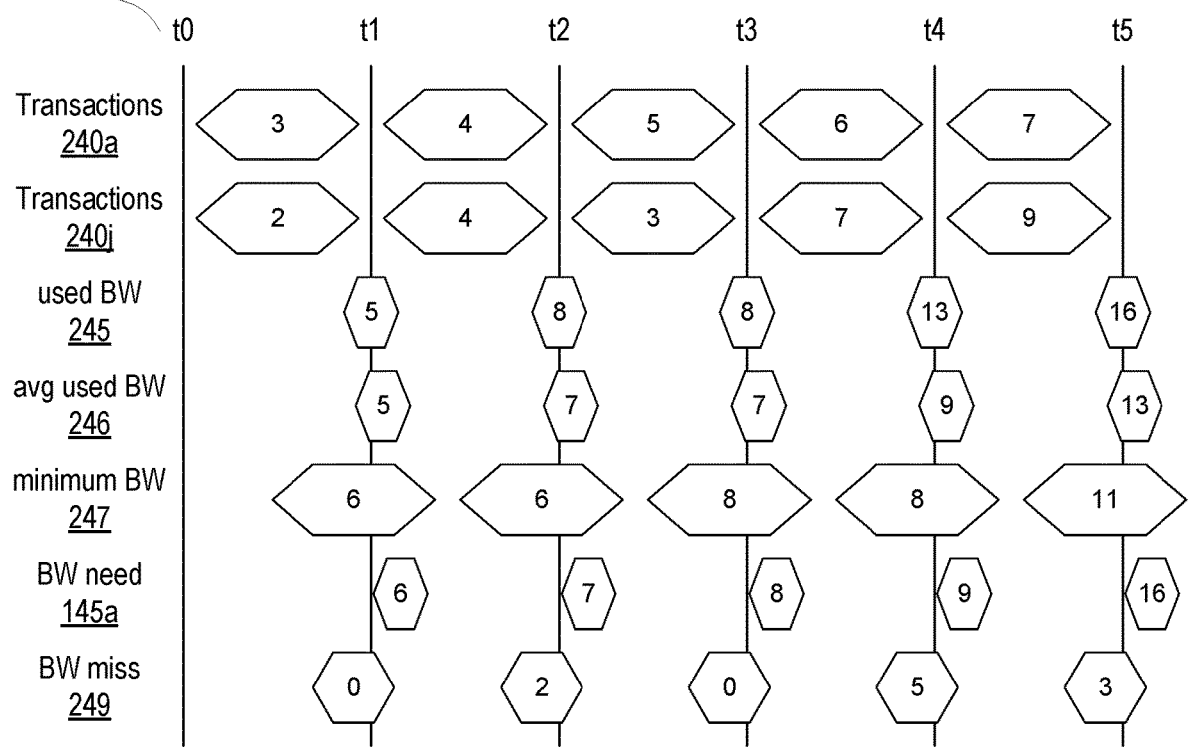
FIG. 2

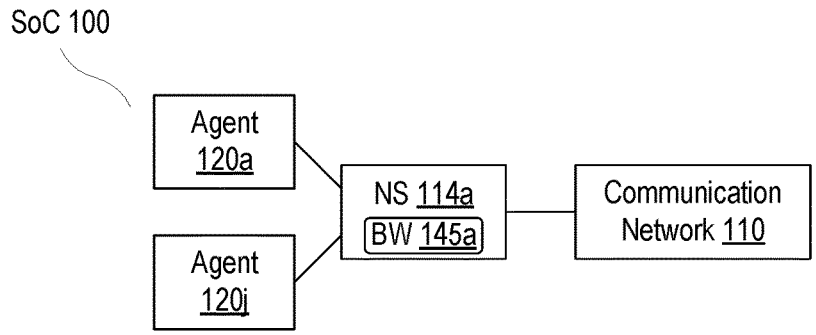
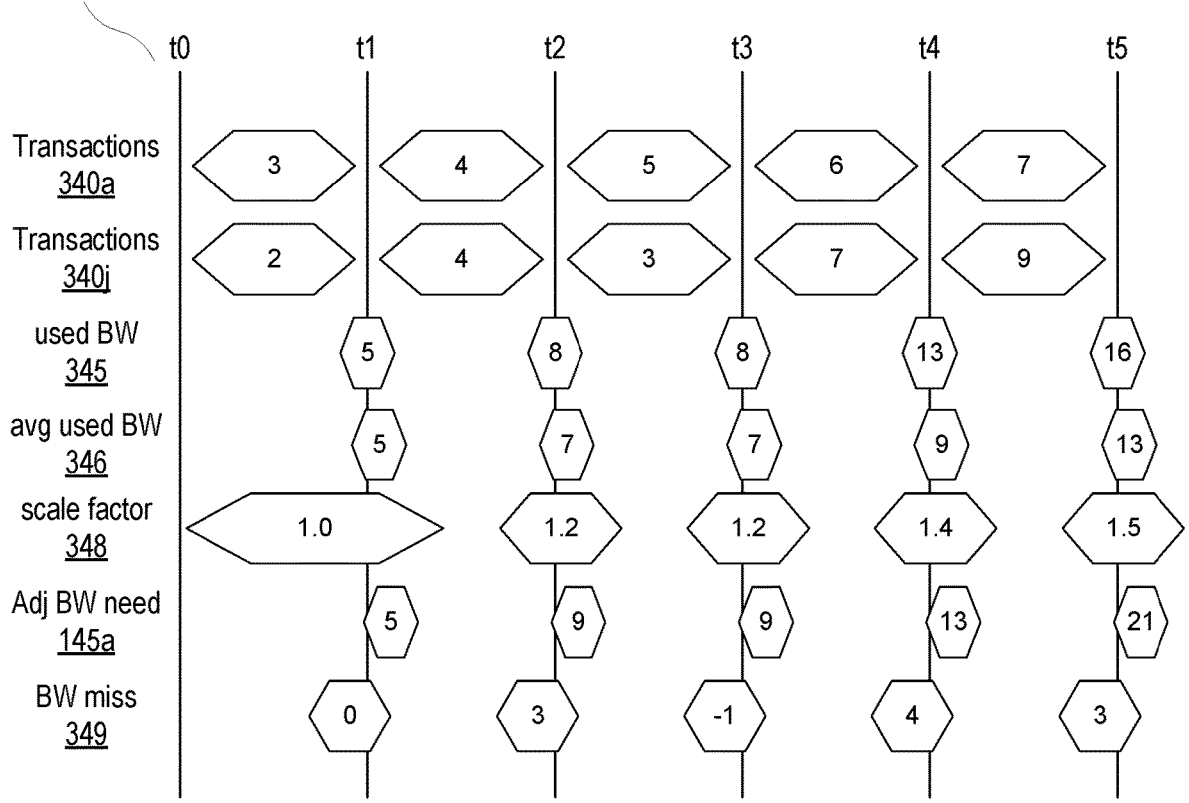
FIG. 3

800

---

Determining, by a power management circuit in a system-on-chip (SoC), a network power budget based on a determined power consumption of the SoC.
810

↓

Determining, by a bandwidth regulation circuit in the SoC for an upcoming time window, a power-based bandwidth budget using the network power budget.
820

↓

Estimating, by a particular one of a plurality of network switching circuits coupled to a communication network in the SoC, a bandwidth need for data transactions during the upcoming time window.
830

↓

Determining, by the bandwidth regulation circuit using received estimated bandwidth needs, a global bandwidth forecast for the communication network.
840

↓

Allocating, by the bandwidth regulation circuit using the global bandwidth forecast and the power-based bandwidth budget, bandwidth to the plurality of network switching circuits for use during the upcoming time window.
850

```
┌─────────────────────────────────────────────────────────────────┐
│ Adjusting, by the bandwidth regulation circuit using a scaling  │
│ factor, the estimated bandwidth need received from the          │
│ particular network switching circuit, wherein the scaling       │
│ factor is associated with the particular network switching      │
│ circuit.                                                        │
│ 910                                                             │
└─────────────────────────────────────────────────────────────────┘
                                │
                                ▼
┌─────────────────────────────────────────────────────────────────┐
│ Adjusting, by the bandwidth regulation circuit, the scaling     │
│ factor based on a determined accuracy of previous estimated     │
│ bandwidth needs received from the particular network            │
│ switching circuit.                                              │
│ 920                                                             │
└─────────────────────────────────────────────────────────────────┘
                                │
                                ▼
┌─────────────────────────────────────────────────────────────────┐
│ Comparing, by the particular network switching circuit, the     │
│ estimated bandwidth need to a minimum bandwidth request.        │
│ 930                                                             │
└─────────────────────────────────────────────────────────────────┘
                                │
                                ▼
┌─────────────────────────────────────────────────────────────────┐
│ In response to determining that the estimated bandwidth need is │
│ less than the minimum bandwidth request, providing, by the      │
│ particular network switching circuit, the minimum bandwidth     │
│ request in place of the estimated bandwidth need to the         │
│ bandwidth regulation circuit.                                   │
│ 940                                                             │
└─────────────────────────────────────────────────────────────────┘
```

FIG. 9

NETWORK FABRIC POWER MANAGEMENT

BACKGROUND

Technical Field

Embodiments described herein are related to computing systems, including computer systems implemented as systems-on-a-chip (SoCs) and multichip packages. More particularly, embodiments are directed towards techniques for managing power for a communication network in a computer system.

Description of the Related Art

A network fabric interconnect may provide high bandwidth and low latency transport layers between various agents coupled across a plurality of networks in an integrated circuit or multichip system. Such interconnect architectures may be designed to have various specialized lanes for transporting data between each of the various agents, for example, central processing units (CPUs), graphic processing units (GPUs), neural processing engines, memory systems and the like. To support a unified memory space, a high bandwidth network fabric may employ network switches that are fully buffered. A consequence of using such switches may be that theoretical peak bandwidth is the sum of the maximum peak bandwidth between the various branches of the network fabric and can total up to be far higher than may be utilized in practice, e.g., on the order of terabits/second while actual average sustained bandwidth may be orders of magnitude lower. Actual application bandwidth, therefore, may frequently be much less than the peak bandwidth that is specified for worst case conditions in which all agents operate simultaneously.

To maintain the functional robustness, however, a system is typically designed to correctly handle worst case conditions, e.g., all networks in a fabric transporting data at a maximum possible bandwidth. Accordingly, peak power consumption of, e.g., 100 amps, may have to be supported by power supplies, voltage regulator circuits, and power routing. Designing for such conditions may increase circuit sizes, power consumption, circuit complexity, and so forth.

BRIEF DESCRIPTION OF THE DRAWINGS

The following detailed description makes reference to the accompanying drawings, which are now briefly described.

FIG. 2 shows a block diagram of an embodiment of a portion of SoC 100 of FIG. 1 as well as a chart of signals associated with SoC 100.

FIG. 3 depicts a block diagram of another embodiment of the portion of SoC 100 of FIG. 1 as well as a different chart of signals associated with SoC 100.

FIG. 8 illustrates a flow diagram of an embodiment of a method for managing power of a communication network using a bandwidth regulation circuit.

FIG. 9 depicts a flow diagram of an embodiment of a method for adjusting an estimated bandwidth need that is used by a bandwidth regulation circuit.

Figure 1:
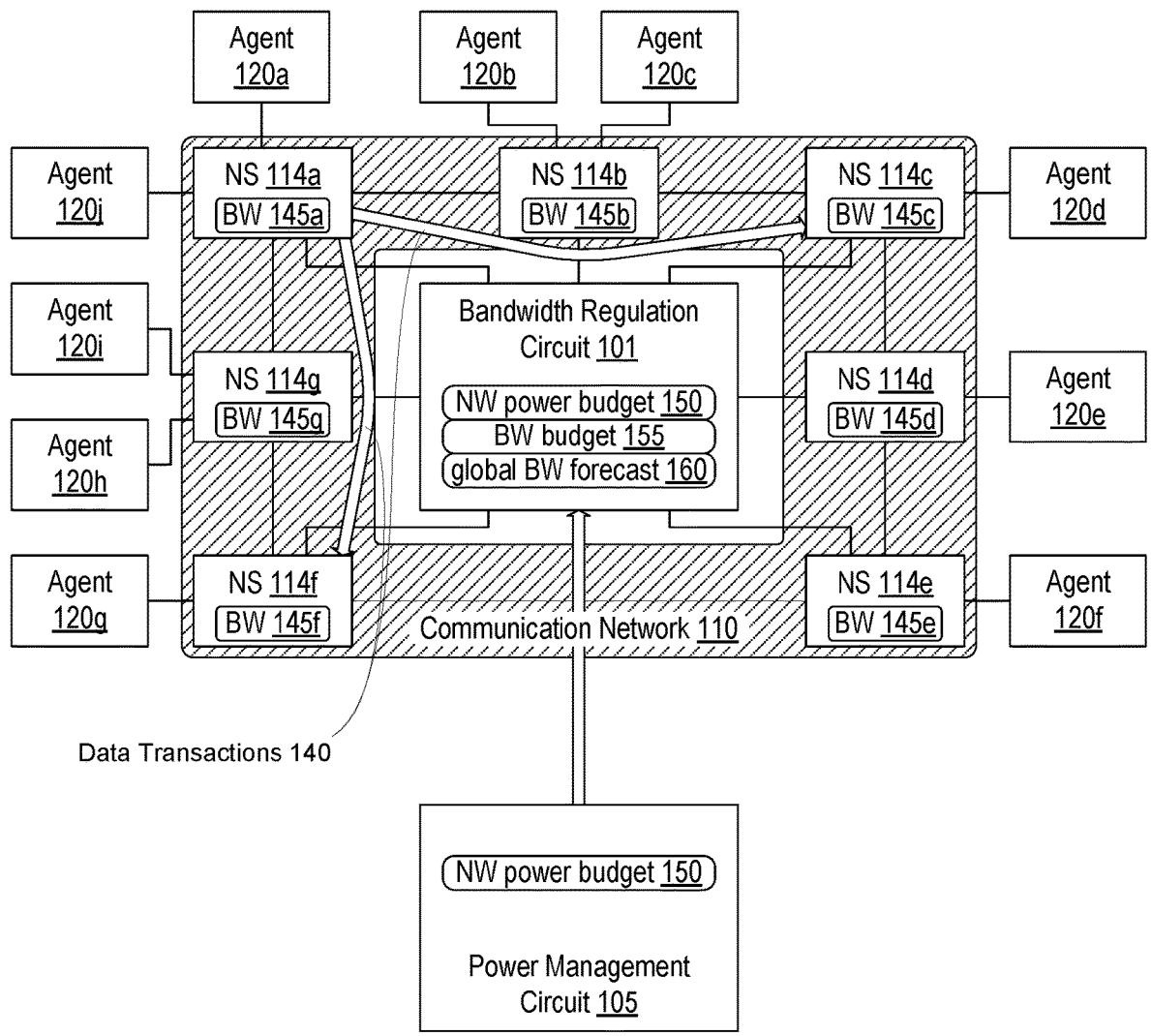
FIG. 1 illustrates a block diagram of an embodiment of an SoC that includes a bandwidth regulation circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

Various integrated circuits and multichip systems may employ a plurality of communication networks. As used herein, "communication network," or simply "network," refers collectively to various agents that communicate, via a common set of network switches. Such networks may be physically independent (e.g., having dedicated wires and other circuitry that form the network) and logically independent (e.g., communications sourced by agents in the system may be logically defined to be transmitted on a selected network of the plurality of networks and may not be impacted by transmission on other networks). In some embodiments, network switches may be included to transmit packets on a given network. As used herein, an "agent" refers to a functional circuit that is capable of initiating (sourcing) or being a destination for communications on a network. An agent may generally be any circuit (e.g., CPU, GPU, neural processing engine, peripheral, memory controller, etc.) that may source and/or sink communications on a given network. A source agent generates (sources) a communication, and a destination agent receives (sinks) the communication. A given agent may be a source agent for some communications and a destination agent for other communications. In some cases, communication between two agents (also referred to as a "transaction") may cross between two or more of the networks.

By providing physically and logically independent networks, high bandwidth may be achieved via parallel communication on the different networks. Additionally, different traffic may be transmitted on different networks, and thus a given network may be optimized for a given type of traffic. For example, a multicore CPU in an system may be sensitive to memory latency and may cache data that is expected to be coherent among the cores and memory. Accordingly, a CPU network may be provided on which the cores and the memory controllers in a system are agents. Another network may be an input/output (I/O) network. This I/O network may be used by various peripheral devices ("peripherals") to communicate with memory. The network may support the bandwidth needed by the peripherals and may also support cache coherency. Furthermore, the system may additionally include a relaxed order network. The relaxed order network may be non-coherent and may not enforce as many ordering constraints as an I/O or a CPU network. The relaxed order network may be used by GPUs to communicate with memory controllers. Other embodiments may employ any subset of the above networks and/or any additional networks, as desired.

This combination of networks in a system may be referred to as a "network fabric" or simply a "fabric." In some instances, a "global fabric" may be used to refer to the various communication paths that are "woven" across all networks in a system. A "local fabric," therefore, may refer to communication paths "woven" across a subset of networks and or portions of a network.

As described above, designing power sources for the global fabric may require planning for a worst-case scenario in which all networks operate at maximum bandwidth. To address issues described above, designers may want a proactive power management scheme in which a peak power allocation is restricted to less than a sum of the maximum bandwidths of all networks in the fabric. To proactively manage peak power, the scheme uses a predictor attached to each agent, the predictor requesting future allocation from a central regulation circuit that examines all incoming requests and responds with an appropriate allocation to each requesting agent. The agents, in turn, may be designed to stay within their allocation during a given time window.

For the ease of discussion, various embodiments in this disclosure are described as being implemented using one or more SoCs. It is to be understood that any disclosed SoC can also be implemented using a chiplet-based architecture. Accordingly, wherever the term "SoC" appears in this disclosure, those references are intended to also suggest embodiments in which the same functionality is implemented via a less monolithic architecture, such as via multiple chiplets, which may be included in a single package in some embodiments.

On a related note, some embodiments are described herein that include more than one SoC. Such architectures are to be understood to encompass both homogeneous designs (in which each SoC includes identical or almost identical functionality) and heterogeneous designs (in which the functionality of each SoC diverges more considerably). Such disclosure also contemplates embodiments in which the functionalities of the multiple SoCs are implemented using different levels of discreteness. For example, the functionality of a first system could be implemented on a single IC, while the functionality of a second system (which could be the same or different than the first system) could be implemented using a number of co-packaged chiplets.

FIG. 1 illustrates a block diagram of an embodiment of a computer system that uses a bandwidth regulation circuit to determine a power-based network bandwidth budget is illustrated. System-on-chip (SoC) 100 includes a plurality of agent circuits, agents 120a-120j (collectively 120), configured to generate data transactions 140, and communication network 110 configured to transfer data transactions 140 between two or more agent 120. SoC 100 further includes a plurality of network switching circuits (NS 114a-114g, collectively 114), coupled to ones of agents 120 and to communication network 110, as well as bandwidth regulation circuit 101 that is configured to moderate power consumption of communication network 110. SoC 100 may further include power management circuit 105 that is configured to provide network power budget 150 to bandwidth regulation circuit 101. In some embodiments, SoC 100 may be implemented using one or more integrated circuits, which may be included in a computing system, such as a desktop or laptop computer, a smartphone, a tablet computer, a wearable smart device, or the like.

As described above, agents 120 may include CPUs, GPUs, neural processing engines, various peripherals, memory controllers, and the like. Communication network 110 enables the transport of data transactions, e.g., from agent 120a to agent 120d. Ones of network switching circuits 114 couple respective subsets of agent 120 to communication network 110, facilitating the transport of data transactions 140 between particular ones of agents 120. For example, network switching circuit 114a couples agents 120a and 120j to communication network 110, while network switching circuit 114c couples agent 120d to communication network 110. Accordingly, a given data transaction 140 sent by agent 120a to agent 120d will be received from agent 120a by network switching circuit 114a and sent to network switching circuit 114c, which will, in turn, send the given data transaction to agent 120d. In various embodiments, network switching circuit 114a may have a direct connection to network switching circuit 114c or may have to communicate via one or more of the other network switching circuits 114. Addition details regarding network topologies is disclosed below in regards to FIGS. 6 and 7.

Although described as a single network, communication network 110 may be a network fabric including a plurality of communication networks. For example, communication network 110 may include a bulk network for transporting bulk priority data transactions between respective agents, a processor network that enables communication between various processor cores and/or core complexes, and a memory network for transporting data transaction to and from one or more memory circuits. One or more of network switching circuits 114 may be capable of accessing two or more different networks, while other ones of network switching circuits may be restricted to a single network.

Ones of network switching circuits 114 are, as shown, configured to estimate a bandwidth need (e.g., BW 145a-145g, collectively 145) for data transactions 140 to be sent via the respective network switching circuits 114 in an upcoming time window. For example, network switching circuits 114 may be configured to generate an estimated bandwidth need 145 every millisecond, every 1000 network bus cycles, or any other suitable interval. For each interval, bandwidth needs 145 indicate an estimated number of data transactions 140 that a respective network switching circuit 114 will perform in an upcoming time window between two intervals. For example, network switching circuit 114b may generate bandwidth need 145b based on a total number of data transactions that are expected to be performed for each of agents 120b and 120c. In some embodiments, bandwidth need 145b is estimated just for write data transactions in which agents 120b and 120c sent data to other ones of agents 120. In other embodiments, bandwidth need 145b may include estimates of a number of data transactions in which data is sent from or received by agents 120b and 120c. Network switching circuits 114 send their respective bandwidth needs 145 to bandwidth regulation circuit 101.

As illustrated, bandwidth regulation circuit 101 is configured to moderate power consumption of communication network 110 by allocating bandwidth among network switching circuits 114. Bandwidth regulation circuit 101 may receive network power budget 150 from power management circuit 105. Power management circuit 105 is configured to determine, at a predetermined time interval, network power budget 150 based on corresponding determined power consumptions of SoC 100. After network power budget 150 is determined for a given time window, power management circuit 105 may send, at the predetermined time interval, a respective network power budget 150 to bandwidth regulation circuit 101.

In other embodiments, power management circuit 105 may additionally or alternatively, be configured to determine, in response to a change in power consumption of SoC 100, an updated network power budget 150 based on the change in power consumption. In some such embodiments, the change in power consumption may satisfy a particular threshold level of power in order to trigger an update to network power budget 150. After an updated network power budget 150 is determined, power management circuit 105 may send network power budget 150 to bandwidth regulation circuit 101.

In response to receiving the updated network power budget 150, bandwidth regulation circuit 101 may determine a power-based bandwidth budget (e.g., BW budget 155) using network power budget 150 for the upcoming time window. Bandwidth regulation circuit 101, may be further configured to determine bandwidth budget 155 using a respective frequency of one or more network clock signals and/or a respective voltage level of one or more network power signals. For example, bandwidth regulation circuit 101 may calculate bandwidth budget 155 by estimating how many data transactions 140 may be performed while consuming no more power than is indicated by network power budget 150. Voltage levels and frequencies of power signals and clock signals may impact how much power a given data transaction may consume. By estimating a power consumption of a single data transaction, bandwidth regulation circuit 101 may be capable of determining how many data transactions can be performed within the network power budget.

As shown, bandwidth regulation circuit 101 may also use estimated bandwidth needs 145, received from network switching circuits 114, to determine global bandwidth (BW) forecast 160. Using global bandwidth forecast 160 for the upcoming time window and bandwidth budget 155, bandwidth regulation circuit 101 may allocate bandwidth budget 155 among network switching circuits 114. For example, if global bandwidth forecast 160 is less than bandwidth budget 155, then each of network switching circuits 114 may be allocated all bandwidth that they estimated. In some embodiments, one or more of network switching circuits 114 may receive a larger allocation than estimated if there is a surplus in bandwidth budget 155. On the other hand, if there is a deficit in bandwidth budget 155, then bandwidth regulation circuit 101 may allocate less than the estimated bandwidth need 145 for one or more of network switching circuits 114.

Various techniques may be used to allocate available bandwidth budget 155 among network switching circuits 114. For example, one or more of agents 120 may be identified as having a higher priority that other agents 120. Agent 120e may, for example, be identified as a primary processor core complex and therefore, be assigned a highest priority among agents 120. In such a case, network switching circuit 114d may receive a highest percentage of bandwidth need 145d in order to reduce an impact of a limited available bandwidth budget 155 to agent 120e. Other agents 120, e.g., agents 120h and 120i, may correspond to lower priority peripherals, such as USB interfaces or non-volatile memory interfaces, that may be capable of performing with lower bandwidth allocations without a noticeable impact to performance of a device in which SoC 100 is included. In some embodiments, agent priorities may be dynamic. For example, an operating system executing on one or more cores, or a system management processor in SoC 100 may be configured to identify one or more agents that have a temporary need for high network bandwidth, and therefore, may be assigned a higher priority until the temporary need has been satisfied. In some embodiments, round-robin, or credit-based techniques may be used to arbitrate allocation of available bandwidth budget 155 among two or more agents 120. Use of various combinations of such techniques is also contemplated.

By determining an estimated network bandwidth need for a plurality of network switching circuits in a communication network, a bandwidth regulation circuit may be capable of translating a power consumption budget into a number of data transactions that may be performed within a given time window without exceeding a power consumption limit. Such a technique may allow for greater performance of ones of the network switching circuits when a global bandwidth need is less than the determined budget. The technique may further provide protection against exceeding physical power supply limits if a bandwidth need exceeds an available bandwidth budget over one or more time windows. Having such a bandwidth regulation circuit in an SoC may further allow design considerations for power supply signals to be eased if worst-case network conditions are not expected to occur frequently. The bandwidth regulation circuit may provide adequate protection to prevent rare cases of worst-case operating conditions without having to over-design power supply circuits to handle such rarities.

It is noted that the system of FIG. 1, is merely an example. SoC 100 has been simplified to highlight features relevant to this disclosure. Elements not used to describe the details of the disclosed concepts have been omitted. For example, SoC 100 may include various additional circuits that are not illustrated, such as one or more power supply circuits, clock management circuits, memory circuits, and the like. Although only ten agents and seven network switching circuits are shown, any suitable number of such circuits may be included in a given SoC. As disclosed above, communication network 110 may be a network fabric including a plurality of communication networks.

In FIG. 1, circuits for translating a power budget of a network into a bandwidth budget, and then allocating the budgeted bandwidth among a plurality of network switching circuits is shown. As disclosed above, such bandwidth allocations may be performed for a series of time windows. An example of operation of a bandwidth regulation circuit across a series of time windows is depicted in FIG. 2.

Moving to FIG. 2, a block diagram of a portion of SoC 100 in FIG. 1 is shown along with a timing diagram associated with operation of SoC 100. The illustrated elements of SoC 100 include agents 120a and 120j, both coupled to network switching circuit 114a which, in turn, is coupled to communication network 110. The elements of SoC 100 may perform as described above in regards to FIG. 1. Chart 200 depicts transactions initiated by agent 120a (transactions 240a) and by agent 120j (transactions 240j) during five successive time windows. In addition, chart 200 depicts five additional values determined by network switching circuit 114a. Used bandwidth (BW) 245 tracks a number of transactions performed in the previous time window. Average used BW 246 is a rolling average of used BW 245 over several prior time windows. Minimum BW 247 indicates a minimum value that network switching circuit 114a should request for each time window. BW need 145a is the bandwidth that is requested by network switching circuit 114a. BW miss 249 is a difference between bandwidth requested and bandwidth used for each time window.

As illustrated, network switching circuit 114a is configured to track a number of data transactions sent by network switching circuit 114a over a prior time window. For example, at time t1, network switching circuit 114a determines that five transactions were sent between agent 120a and 120j in the prior time window between times t0 and t1. In the subsequent time windows (e.g., times t1 to t2, t2 to t3, and so forth), network switching circuit 114a tracks that agents 120a and 120j combined to send eight, eight, thirteen, and sixteen transactions, respectively.

In some embodiments, network switching circuit 114a is configured to estimate BW need 145a using a rolling average of data transactions sent over a series of preceding time windows. For example, network switching circuit 114a generates values of average used BW 246 based on one or more values of used BW 245. As shown at time t1, network switching circuit 114a determines that five transactions were initiated by agents 120a and 120j. If no other prior values of used BW 245 are available (e.g., a reset occurred at time t0), then average used BW 246 equals used BW 245 for the t0-to-t1 time window. For the subsequent time windows, new values of used BW 245 are averaged with one or more of the older values of used BW 245 to generate average used BW 246. Network switching circuit 114a may use a most recent value of average used BW 246 as a BW need 145a, and send this value to bandwidth regulation circuit 101.

In other embodiments, network switching circuit 114a may use additional criteria to determine BW need 145a. For example, network switching circuit 114a may look at a trend of recent values of used BW 245, such as whether usage is increasing, decreasing, or remaining consistent over the past several time windows. If the usage has been increasing (or decreasing) then BW need 145a may be incremented (or decremented) by a number based on the slope of the increase (or decrease). In some embodiments, network switching circuit 114a is further configured to track a number of forecast misses (BW miss 249), wherein a forecast miss occurs when a given estimated BW need 145a is lower than a corresponding BW used 245. In some cases, a number of transactions 240a and 240j that are sent in a time window is capped by an allocation assigned by bandwidth regulation circuit 101. In such cases, BW miss 249 may be based on a number of transactions 240a and 240j that are requested by agents 120a and 120j even if all transactions are not performed due to the allocation cap. Transactions not performed may be queued for a subsequent time window and network switching circuit 114a may add the number of queued transactions to BW need 145a for the subsequent time window.

As illustrated, network switching circuit 114a is also configured to send, in response to a determination that minimum BW 247 is greater than the estimated bandwidth need, minimum BW 247 as BW need 145a to bandwidth regulation circuit 101. As shown at times t1 and t3, minimum BW 247 is greater than average used BW 246 (used to determine the estimated bandwidth need in this example), resulting in minimum BW 247 being sent to bandwidth regulation circuit 101. In contrast, average used BW 246 is used as BW need at times t2, t4, and t5. Network switching circuit 114a may also adjust minimum BW 247 for subsequent time windows based, for example, on the determined BW miss 249 for the most recent time window or number of recent time windows. Network switching circuit 114a may use additional criteria for determining minimum BW 247, such as a slope of recent values of BW miss 249, in a similar manner as described above.

Bandwidth regulation circuit 101, as described above, is configured to determine global bandwidth forecast 160 and allocate the power-based bandwidth budget 155 for a next time window using the received values of BW need 145a from network switching circuit 114a as well as other BW needs 145 received from other network switching circuits 114. If there is a surplus of bandwidth budget 155, bandwidth regulation circuit 101 may assign the surplus to ones of network switching circuits 114 using any suitable technique. For example, network switching circuits 114 that have had high values of BW miss for recent time windows may be prioritized for receiving excess allocations.

It is noted that the example shown in FIG. 2 is one depiction of operation of a network switching circuit utilizing the disclosed techniques. The numbers of transactions shown in chart 200 are merely for demonstrative purpose and are not intended to be representative of a number of transactions handled by a given network switching circuit in a typical time window. In other embodiments, any suitable number of transactions may be initiated and processed, including hundreds, thousands, or more.

In the description of FIG. 2, operation of a network switching circuit in conjunction with a bandwidth regulation circuit is disclosed. In this description, adjustments to a bandwidth need estimate are mentioned. Details for an example of how an estimated bandwidth need may be adjusted by a network switching circuit are illustrated in FIG. 3.

Turning to FIG. 3, a block diagram of the same portion of SoC 100 as shown in FIG. 2 is shown, along with another timing diagram associated with operation of SoC 100. In a similar manner as chart 200, chart 300 depicts transactions initiated by agent 120a (transactions 340a) and by agent 120j (transactions 340j) during five successive time windows. Chart 300 additionally depicts five values determined by network switching circuit 114a. Used bandwidth (BW) 345, average (avg) used BW 346 and BW miss 349 are similar to the similarly numbered elements of chart 200. Scale factor 348 is an adjustment value that network switching circuit 114a may use to adjust a given bandwidth need. Adjusted (adj) BW need 145a is the bandwidth that is requested by network switching circuit 114a after scale factor 348 has been applied.

As described above in regards to FIG. 2, network switching circuit may be configured to track a number of forecast misses (BW miss 349), wherein a forecast miss occurs when a given estimated bandwidth need (adjusted BW need 145a) is lower than a corresponding actual bandwidth used. SoC 100 may be reset at or before time t0, resulting in network switching circuit 114a not having any prior history to base adjustments on. Accordingly, at time t1, average used BW 346 is equal to used BW 345 for the just completed time window. Scale factor 348 may be set to a default value, such as '1.0' which may result in no adjustments to the bandwidth need. Network switching circuit 114a may determine adjusted BW need 145a based on average used BW 346 and scale factor 348, for example, by multiplying the two values, resulting in a value of adjusted BW need 145a of five.

At the end of the next time window at time t2, eight transactions are performed by network switching circuit 114a, resulting in a rolling average of 6.5 transactions, which may be rounded up to seven for average used BW 346. BW miss is three (used BW 345 of eight at t2, minus adjusted BW need 145a of five estimated at time t1). Based on BW miss 349 of three at time t2, network switching circuit 114a may increase scale factor 348 from '1.0' to '1.2.' Network switching circuit 114a determines adjusted BW need 145a based on tracked rolling average used BW 346 of seven and scale factor of '1.2' at t2. The resulting adjusted BW need of '8.4' may be rounded up to nine, and sent to bandwidth regulation circuit 101.

This process may repeat at the end of each time window, with scale factor 348 being incremented when BW miss is above a particular threshold (e.g., one). It is noted that BW miss is a negative number (−1) at time t3, indicating that more bandwidth was requested than needed. In some embodiments, scale factor 348 may be decremented in response to a surplus of bandwidth for network switching circuit 114a at the end of a time window. In other embodiments, scale factor 348 may be decremented only if the surplus satisfies a threshold number of transactions. In some embodiments, scale factor 348 may be adjusted only in response to a deficit (or surplus) occurs for a threshold number of consecutive time windows.

Use of a scale factor may allow network switching circuit 114a to more quickly adjust to sudden increases or decreases in the number of transactions being performed by agents 120a and 120j. In some embodiments, use of a scale factor may be used in conjunction with use of a minimum bandwidth need, such as described in regards to FIG. 2.

It is noted that the system depicted in FIG. 3 is merely an example to demonstrate the disclosed concepts. Although the network switching circuit is described as generating the scale factor, in other embodiments, the scaling factor may be determined by another circuit, such as a bandwidth regulation circuit. In a similar manner as described for FIG. 2, the numbers of transactions depicted may be lower than a number being performed in other embodiments.

FIGS. 1-3 reference a single bandwidth regulation circuit. Other forms of a bandwidth regulation system are contemplated, such as a hierarchal structure. An example of a hierarchal bandwidth regulation circuit is depicted in FIG. 4.

Figure 4:
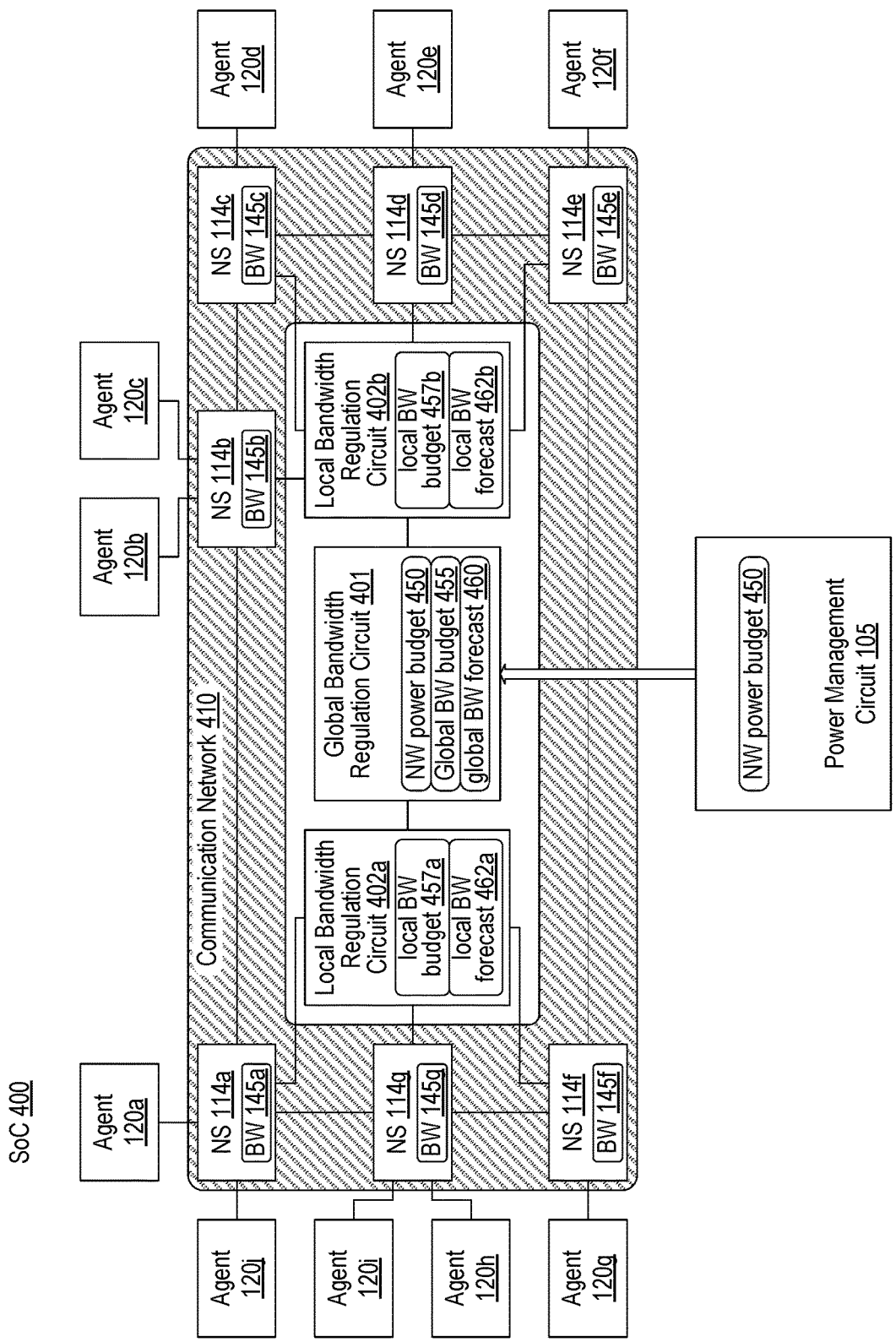
FIG. 4 illustrates a block diagram of an embodiment of a different SoC that includes a hierarchal bandwidth regulation circuit.

Proceeding to FIG. 4, a block diagram of an embodiment of a computer system that uses a hierarchal bandwidth regulation circuit to determine a power-based network bandwidth budget is illustrated. Similar to SoC 100 of FIG. 1, SoC 400 includes a plurality of agent circuits, agents 120a-120j (collectively 120), and communication network 410. SoC 400 further includes a plurality of network switching circuits (NS 114a-114g, collectively 114), coupled to ones of agents 120 and to communication network 410, and configured to enable communication between agents 120 via communication network 410. SoC 400 includes global bandwidth regulation circuit 401 as well as local bandwidth regulation circuits 402a and 402b (collectively 402). Together, global bandwidth regulation circuit 401 and local bandwidth regulation circuits 402 are configured to moderate power consumption of communication network 410. SoC 400 further includes power management circuit 105 that is configured to provide network power budget 450 to global bandwidth regulation circuit 401.

As illustrated, a hierarchal bandwidth regulation circuit in SoC 400 includes global bandwidth regulation circuit 401 and a plurality of local bandwidth regulation circuits 402. Local bandwidth regulation circuits 402 are coupled to respective subsets of the plurality of network switching circuits 114. Local bandwidth regulation circuit 402a is coupled to network switching circuits 114a, 114f and 114g. Local bandwidth regulation circuit 402b is coupled to network switching circuits 114b, 114c, 114d, and 114e.

Global bandwidth regulation circuit 401, as shown, is configured to allocate, for a first time period, respective portions of power-based global bandwidth budget 455 among local bandwidth regulation circuits 402. Global bandwidth regulation circuit 401 receives network power budget 450 from power management circuit 105. In a manner as described above in regards to FIG. 1, power management circuit 105 may be configured to update, based on corresponding determined power consumption of SoC 100, network power budget 450 at a predetermined time interval and/or in response to a change in power consumption of SoC 100. After an updated network power budget 450 is determined, power management circuit 105 may send a current value of network power budget 450 to global bandwidth regulation circuit 401.

In response to receiving an updated network power budget 450, global bandwidth regulation circuit 401 may determine a power-based global bandwidth budget 455 using a current network power budget 450. Global bandwidth budget 455 may be determined using frequencies of one or more network clock signals and/or voltage levels of one or more network power signals. These frequencies and/or voltage levels may be used to estimate a power consumption of a single data transaction which, in turn, may be used to determine how many data transactions, e.g., global bandwidth (BW) budget 455, can be performed within network power budget 450.

Local bandwidth regulation circuits 402a and 402b are configured to determine, for a second time period that is shorter than the first time period, local bandwidth (BW) forecasts 462a and 462b, respectively. Local bandwidth forecasts 462a and 462b may be determined using respective estimated bandwidth needs 145 received from the respective subset of network switching circuits 114. For example, local bandwidth regulation circuit 402a receives BW needs 145a, 145f, and 145g from the respective network switching circuits 114, and then determines local bandwidth forecast using these received BW needs 145. Similarly, local bandwidth regulation circuit 402b determines local bandwidth forecast 462b using BW needs 145b, 145c. 145, d, and 145e.

Local bandwidth regulation circuits 402 send their respective local bandwidth forecasts 462 to global bandwidth regulation circuit 401. Global bandwidth regulation circuit 401, in turn, uses a most current value of each of local bandwidth forecasts 462 to determine global bandwidth (BW) forecast 460. Global bandwidth regulation circuit 401 may then determine local bandwidth (BW) budgets 457a and 457b using global bandwidth forecast 460 and global bandwidth budget 455. Local bandwidth budgets 457a and 457b may then be sent to local bandwidth regulation circuits 402a and 402b, respectively. As depicted, local bandwidth regulation circuits 402 may then allocate, using local bandwidth forecast 462a and 462b, a respective portion of the power-based bandwidth budget across their respective subsets of network switching circuits 114, using techniques such as disclosed above.

As disclosed, global bandwidth regulation circuit 401 determines global bandwidth budget 455 and local bandwidth budgets 457a and 457b over a first time period. Local bandwidth regulation circuits 402 determine local bandwidth forecasts 462a and 462b over a second time period that is less than the first time period. In some embodiments, local bandwidth regulation circuits 402 may send a subset of their respective local bandwidth forecasts 462 to global bandwidth regulation circuit 401, e.g., every third forecast. In other embodiments, local bandwidth regulation circuits 402 may send all of their respective local bandwidth forecasts 462 to global bandwidth regulation circuit 401.

Accordingly, local bandwidth regulation circuits 402 may allocate network bandwidth to their respective subsets of network switching circuits 114 using a same value of local bandwidth budget 457 for a plurality of second time periods. When global bandwidth regulation circuit 401 updates the respective local bandwidth budgets 457, the updated values may then be used for several iterations of the second time period before subsequent updated local bandwidth budgets 457 are available. By using a hierarchal bandwidth regulation circuit, such as depicted in FIG. 4, available network bandwidth may be allocated to network switching circuits 114 in less time than if a single, centralized bandwidth regulation circuit is used. As SoC designs become more complex and larger, communication time between network switching circuits and a centralized bandwidth regulation circuit may increase, resulting in a lag between a network switching circuit sending an estimated bandwidth need and then receiving a bandwidth allocation based on this need. Use of hierarchal bandwidth regulation circuits may allow the local bandwidth regulation circuits to be physically placed closer to their respective subsets of network switching circuits, thereby reducing the lag time between sending bandwidth needs and receiving bandwidth allocations. Local bandwidth budgets may be updated for the local bandwidth regulation circuits over larger intervals than the local bandwidth allocation s for the network switching circuits without a significant impact to SoC performance.

It is noted that the SoC of FIG. 4 is merely an example. In other embodiments, a different number of local bandwidth regulation circuits may be included in the SoC. The number of agents and network switching circuits may also differ in other embodiments. In various embodiments, power management circuits may be included in an SoC, be implemented as a separate integrated circuit, or combination thereof.

In FIGS. 1-4, the disclosed techniques are described in regards to an SoC. As described above, an SoC may take many forms, such as a single integrated circuit chip, a multichip package with chiplets, a multichip package with homogeneous or heterogeneous ICs, and the like. Bandwidth regulation circuits may be used to manage network power consumption across two or more ICs. An example of an SoC with two ICs is shown in FIG. 5.

Figure 5:
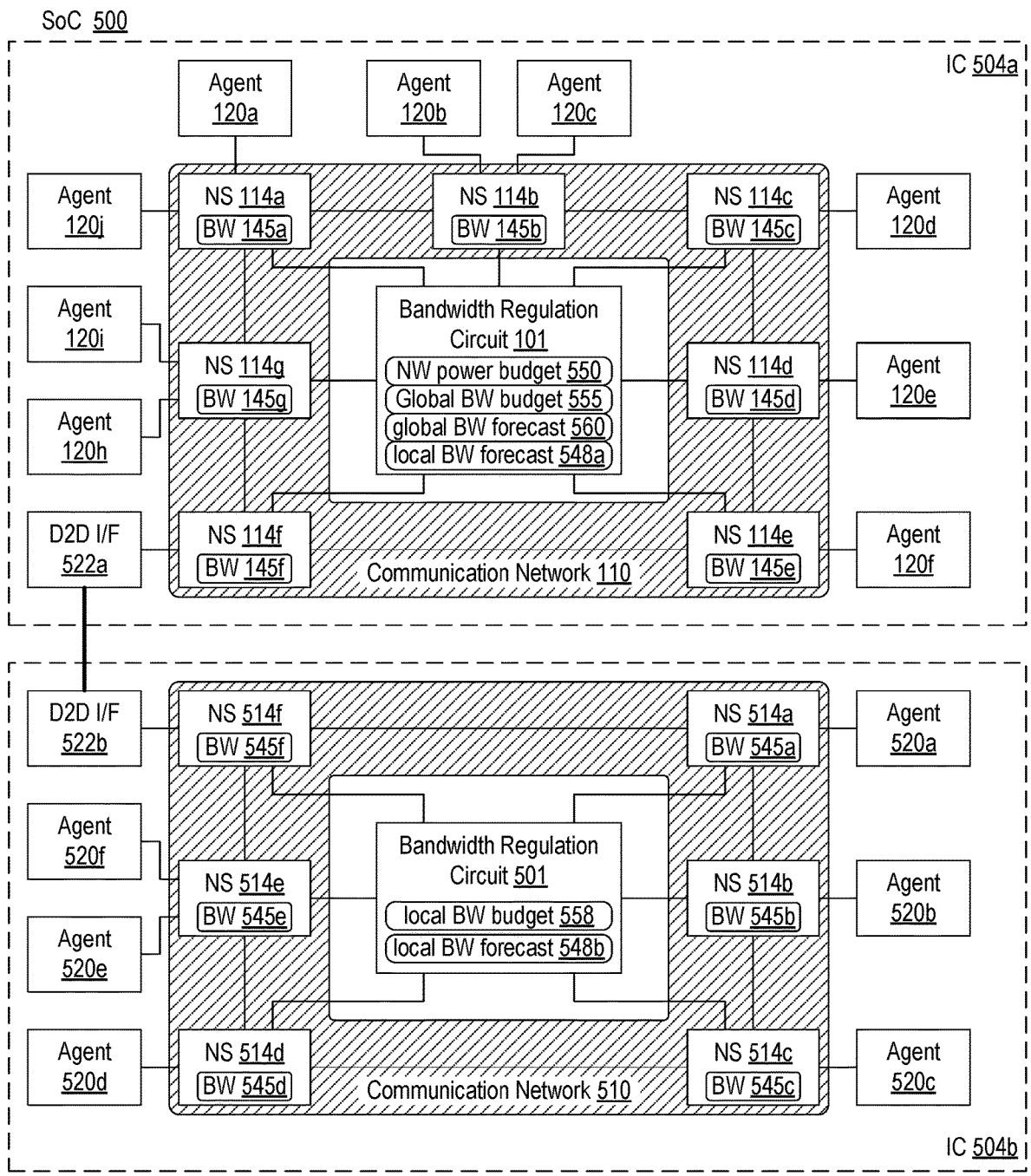
FIG. 5 shows a block diagram of an embodiment of a third SoC that includes two integrated circuits, each with a bandwidth regulation circuit.

Moving now to FIG. 5, a block diagram of an embodiment of a computer system that includes two ICs, each with a respective bandwidth regulation circuit is shown. SoC 500 includes ICs 504a and 504b. IC 504a may, in some embodiments, be an instance of SoC 100 of FIG. 1. As such, IC 504a includes bandwidth regulation circuit 101, agent circuits 120, communication network 110, and network switching circuits 114. As illustrated, die-to-die interface (D2D I/F) 522a of IC 504a corresponds to agent 120g of SoC 100 in FIG. 1. D2D I/F 522a is coupled to a similar D2D I/F 522b in IC 504b, and the pair may be configured to transmit information across communication networks 110 and 510. IC 504b further includes bandwidth regulation circuit 501, agent circuits 520a-520f (collectively 520), communication network 510, and network switching circuits 514a-514f (collectively 514).

In a similar manner as bandwidth regulation circuit 101 in FIG. 1, bandwidth regulation circuit 501 in IC 504b is configured to determine, for network switching circuits 514, local bandwidth forecast 548b using respective estimated bandwidth needs (BW 545a-545f) received from network switching circuits 514. Ones of network switching circuits 514 are respectively coupled to one or more of agent circuits 520 (including D2D I/F 522b), and therefore, the respective BW needs 545 are estimated based on data transaction histories of the coupled agents 520. Local bandwidth forecast 548b may be a summation of all BW needs 545 received by bandwidth regulation circuit 501. Bandwidth regulation circuit 501 may send local bandwidth forecast 548b to bandwidth regulation circuit 101 in IC 504a via D2D I/F 522.

Bandwidth regulation circuit 101, as shown, is configured to determine a power-based bandwidth budget using a global network power budget. Although not shown for clarity, SoC 500 may include a power management circuit, such as power management circuit 105 of FIGS. 1 and 4, that is configured to determine global network (NW) power budget based on operating conditions of ICs 504a and 504b. The power management circuit may be included in IC 504a, IC 504b, a separate IC, or comprised of a plurality of circuits in any suitable combination of ICs, including one or both of ICs 504a and 504b. For example, power management circuits may be included in ICs 504a and 504b and capable of communicating to one another via communication networks 110 and 510 using D2D I/Fs 522. Accordingly, a power management circuit in IC 504b may send operating conditions of IC 504b to a power management circuit in IC 504a, allowing the power management circuit in IC 504a to determine a value for global network power budget 550. In other embodiments, the power management circuit in IC 504b may determine a local network power budget for communication network 510 (e.g., as described above in regards to FIG. 1) and send this local network power budget to the power management circuit in IC 504a.

Bandwidth regulation circuit 101 may also determine, for network switching circuits 114, local bandwidth forecast 548a for IC 504a using respective estimated bandwidth needs 145 received from network switching circuits 114. Network switching circuit 114f, as shown, is coupled to D2D I/F 522a, and therefore, may be configured to determine an estimated BW need 145f for transferring information between D2D I/Fs 522a and 522b. Bandwidth regulation circuit 101 may then determine global bandwidth forecast 560 based on local bandwidth forecast 548a and local bandwidth forecast 548b received from IC 504b.

In other embodiments, network switching circuit 114f may estimate bandwidth need 145f by including local bandwidth forecast 548b, and then providing bandwidth need 145f to bandwidth regulation circuit 101. In such an embodiment, Bandwidth regulation circuit 101 may skip determining local bandwidth forecast 548a and use BW need 145f, along with the other BW needs 145 to determine global bandwidth forecast 560.

As illustrated, bandwidth regulation circuit 101 is further configured to allocate, using local bandwidth forecasts 548a and 548b, a power-based global bandwidth budget 555 across network switching circuits 114 and network switching circuits 514. In some embodiments, such as shown, bandwidth regulation circuit 101 determines local bandwidth budget 558 for all of network switching circuits 514 combined. Bandwidth regulation circuit 501 may then allocate local bandwidth budget 558 among ones of network switching circuits 514.

In embodiments in which network switching circuit 114f combines local bandwidth forecast 548b into bandwidth need 145f, bandwidth regulation circuit 101 may allocate one allotment of bandwidth budget to network switching circuit 114f which, in turn, may derive local bandwidth budget 558 from this single allotment and providing local bandwidth budget 558 to bandwidth regulation circuit 501 for further allocation across network switching circuits 514.

In some embodiments, bandwidth regulation circuit 101 may have a hierarchal structure (e.g., similar to SoC 400 of FIG. 4), and include a plurality of local bandwidth regulation circuits. In such embodiments, bandwidth regulation circuit 501 may function as one of the local bandwidth regulation circuits. A subset of the plurality of local bandwidth regulation circuits may be coupled to respective subsets of network switching circuits 114 in IC 504a. For example, bandwidth regulation circuit 101 may include, in IC 504a, a plurality of local bandwidth regulation circuits, each coupled to respective subsets of network switching circuits 114, while bandwidth regulation circuit 501 performs as an additional local bandwidth regulation circuit with network switching circuits 514 being treated as another subset of network switching circuits. In some embodiments, bandwidth regulation circuit 501 may also have a hierarchal structure, thereby creating an additional layer of hierarchy within IC 504b.

In a hierarchal structure, bandwidth regulation circuit 101 may further include a global bandwidth regulation circuit configured to allocate, for a first time period, respective portions of global bandwidth budget 555 among the various local bandwidth regulation circuits, including bandwidth regulation circuit 501. A particular local bandwidth regulation circuit of the plurality of local bandwidth regulation circuits may be configured to determine, for a second time period that is shorter than the first time period, a local bandwidth forecast using respective estimated bandwidth needs received from a respective subset of the second plurality of network switching circuits. For example, bandwidth regulation circuit 501, during the second time period, receives estimated BW needs 545 from network switching circuits 514, and uses these values to determine local bandwidth forecast 548b. Bandwidth regulation circuit 501 may then allocate, using local bandwidth forecast 548b, local bandwidth budget 558 across network switching circuits 514. Since the second time period is shorter than the first time period, bandwidth regulation circuit 501 may be capable of adjusting to changes in bandwidth needs across network switching circuits 514 in less time than it would take for bandwidth regulation circuit 101 to receive updated BW needs 545 (as well as BW needs 145) and reallocate bandwidth budget across both communication networks 110 and 510. Instead, bandwidth regulation circuit 501 is granted an amount of autonomy to manage local power consumption of communication network 510, while a global bandwidth regulation circuit in bandwidth regulation circuit 101 still maintains an overall management of power consumption across both communication networks 110 and 510, just at a slower pace.

It is noted that the SoC depicted in FIG. 5 merely an example for describing the disclosed techniques. Although two ICs are depicted, any suitable number of ICs may be included in other embodiments. In various embodiments, ICs 504a and 504b may be homogeneous or heterogeneous, including for example, an SoC IC plus one or more chiplet ICs.

Figure 6:
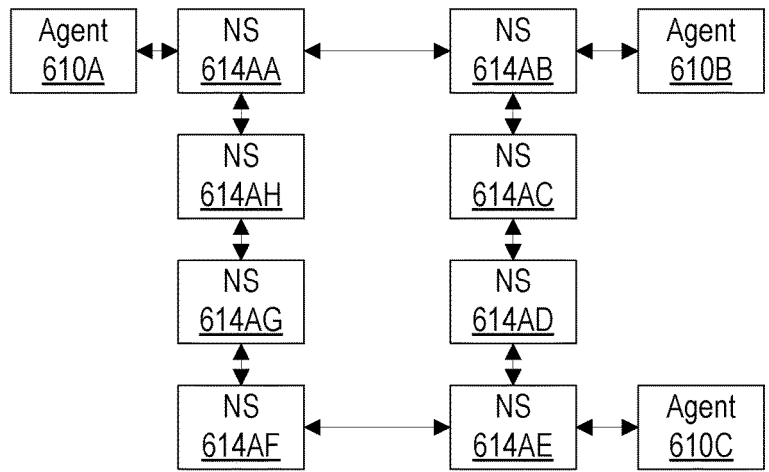
FIG. 6 depicts a block diagram of an embodiment of a network with a ring topology.
Figure 7:
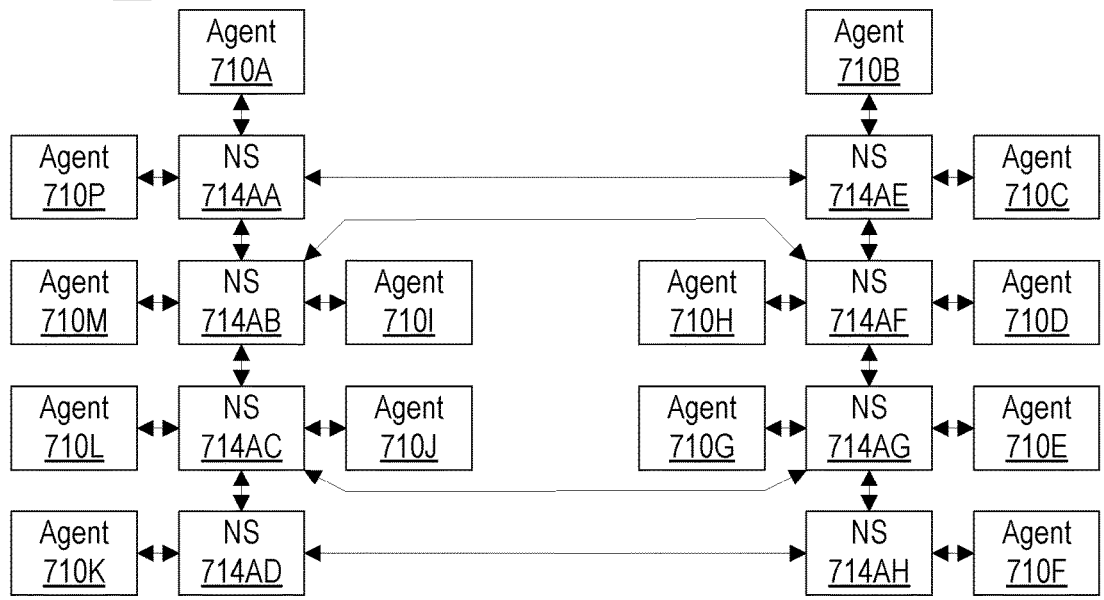
FIG. 7 depicts a block diagram of an embodiment of a network with a mesh topology.

The communications network as described in regards to FIGS. 1-5 may be a single network or a network fabric that includes a plurality of networks. Whether a single network or a fabric of networks, each network may be implemented using any suitable type of network topology. A network fabric may include networks of varying structure. FIGS. 6 and 7 illustrate two examples of network topologies.

Proceeding now to FIG. 6, a block diagram of an embodiment of a network using a ring topology to couple a plurality of agents is shown. In the example of FIG. 6, the ring is formed from network switches 614AA-614AH. Agent 610A is coupled to network switch 614AA; agent 610B is coupled to network switch 614AB; and agent 610C is coupled to network switch 614AE.

As shown, a "network switching circuit," or simply "network switch" is a circuit that is configured to receive communications on a network and forward the communications on the network in the direction of the destination of the communication. For example, a communication sourced by a processor may be transmitted to a memory controller that controls the memory that is mapped to the address of the communication. At each network switch, the communication may be transmitted forward toward the memory controller. If the communication is a read, the memory controller may communicate the data back to the source and each network switch may forward the data on the network toward the source. In an embodiment, the network may support a plurality of virtual channels. The network switch may employ resources dedicated to each virtual channel (e.g., buffers) so that communications on the virtual channels may remain logically independent. The network switch may also employ arbitration circuitry to select among buffered communications to forward on the network. Virtual channels may be channels that physically share a network but which are logically independent on the network (e.g., communications in one virtual channel do not block progress of communications on another virtual channel).

In a ring topology, each network switch 614AA-614AH may be connected to two other network switches 614AA-614AH, and the switches form a ring such that any network switch 614AA-614AH may reach any other network switch in the ring by transmitting a communication on the ring in the direction of the other network switch. A given communication may pass through one or more intermediate network switches in the ring to reach the targeted network switch. When a given network switch 614AA-614AH receives a communication from an adjacent network switch 614AA-614AH on the ring, the given network switch may examine the communication to determine if an agent 610A-610C to which the given network switch is coupled is the destination of the communication.

If so, the given network switch may terminate the communication and forward the communication to the agent. If not, the given network switch may forward the communication to the next network switch on the ring (e.g., the other network switch 614AA-614AH that is adjacent to the given network switch and is not the adjacent network switch from which the given network switch received the communication). As used herein, an "adjacent network switch" to a given network switch may be a network switch to which the given network switch may directly transmit a communication, without the communication traveling through any intermediate network switches.

The example of FIG. 6 is one example of a ring network topology. As illustrated, any pair of adjacent network switches may communicate in both directions, as indicated by the arrows. In some embodiments, however, a ring network may allow communication in only one direction, e.g., only clockwise or only counter-clockwise. Such embodiments may be used, for example, to simplify design of each of the network switches.

Moving to FIG. 7, a block diagram of one embodiment of a network using a mesh topology to couple agents 710A-710P is illustrated. As shown in FIG. 7, network 700 may include network switches 714AA-714AH. Network switches 714AA-714AH are coupled to two or more other network switches. For example, network switch 714AA is coupled to network switches 714AB and 714AE; network switch 714AB is coupled to network switches 714AA, 714AF, and 714AC; etc. as illustrated in FIG. 7. Thus, individual network switches in a mesh network may be coupled to a different number of other network switches. Furthermore, while network 700 has a relatively symmetrical structure, other mesh networks may be asymmetrical, for example, depending on the various traffic patterns that are expected to be prevalent on the network. At each network switch 714AA-714AH, one or more attributes of a received communication may be used to determine the adjacent network switch 714AA-714AH to which the receiving network switch 714AA-714AH will transmit the communication (unless an agent 710A-710P to which the receiving network switch 714AA-714AH is coupled is the destination of the communication, in which case the receiving network switch 714AA-714AH may terminate the communication on network 700 and provide it to the destination agent 710A-710P). For example, in an embodiment, network switches 714AA-714AH may be programmed at system initialization to route communications based on various attributes.

In an embodiment, communications may be routed based on the destination agent. The routings may be configured to transport the communications through the fewest number of network switches (the "shortest path) between the source and destination agent that may be supported in the mesh topology. Alternatively, different communications for a given source agent to a given destination agent may take different paths through the mesh. For example, latency-sensitive communications may be transmitted over a shorter path while less critical communications may take a different path to avoid consuming bandwidth on the short path, where the different path may be less heavily loaded during use, for example. Additionally, a path may change between two particular network switches for different communications at different times. For example, one or more intermediate network switches in a first path used to transmit a first communication may experience heavy traffic volume when a second communication is sent at a later time. To avoid delays that may result from the heavy traffic, the second communication may be routed via a second path that avoids the heavy traffic.

FIG. 7 may be an example of a partially-connected mesh: at least some communications may pass through one or more intermediate network switches in the mesh. A fully-connected mesh may have a connection from each network switch to each other network switch, and thus any communication may be transmitted without traversing any intermediate network switches. Any level of interconnectedness may be used in various embodiments.

To summarize, various embodiments of an apparatus may include a system-on-chip (SoC) that includes a plurality of agent circuits configured to generate data transactions, a communication network configured to transfer data transactions between two or more agent circuits of the plurality of agent circuits, a plurality of network switching circuits, and a bandwidth regulation circuit. The plurality of network switching circuits may be coupled to the plurality of agent circuits and to the communication network. A particular one of the plurality of network switching circuits may be configured to estimate a bandwidth need for data transactions to be sent via the particular network switching circuit in an upcoming time window. The bandwidth regulation circuit may be configured to moderate power consumption of the communication network. To moderate the power consumption the bandwidth regulation circuit may be configured to determine a power-based bandwidth budget using a network power budget for the upcoming time window, and, using estimated bandwidth needs received from the plurality of network switching circuits, to determine a global bandwidth forecast. The bandwidth regulation circuit may also be configured to allocate, using the global bandwidth forecast for the upcoming time window, the power-based bandwidth budget among the plurality of network switching circuits.

In a further example, the SoC may further include a power management circuit that is configured to determine, at a predetermined time interval, respective network power budgets based on corresponding determined power consumptions of the SoC. The power management circuit may also be configured to send, at the predetermined time interval, the respective network power budgets to the bandwidth regulation circuit.

In another example, the SoC may further include a power management circuit that is configured to, in response to a change in power consumption of the SoC that satisfies a threshold level, determine an updated network power budget based on the change in power consumption. The power management circuit may be further configured to send the updated network power budget to the bandwidth regulation circuit. In a further example, the bandwidth regulation circuit may be further configured to determine the power-based bandwidth budget using a frequency of a network clock signal and a voltage level of a network power signal.

In an example, the particular network switching circuit may be further configured to track a number of data transactions sent by the particular network switching circuit over a time window, and to estimate the bandwidth need using a rolling average of data transactions sent over a series of preceding time windows. The bandwidth regulation circuit may be further configured to allocate the power-based bandwidth budget for a next time window.

In a further example, the communication network may include a plurality of fabrics, including a memory fabric coupled to one or more memory circuits. In an embodiment, the particular network switching circuit may be further configured to track a number of forecast misses, wherein a forecast miss occurs when a given estimated bandwidth need is lower than a corresponding actual bandwidth used.

In another embodiment, the particular network switching circuit may also be configured to determine a scaling factor based on the number of forecast misses, and to adjust a next estimated bandwidth need using the scaling factor. In one example, the particular network switching circuit may be further configured to, in response to a determination that the estimated bandwidth need is less than a minimum bandwidth request, send the minimum bandwidth request as the estimated bandwidth need to the bandwidth regulation circuit.

In a further example, the bandwidth regulation circuit may include a plurality of local bandwidth regulation circuits coupled to respective subsets of the plurality of network switching circuits, and a global bandwidth regulation circuit. The global bandwidth regulation circuit may be configured to allocate, for a first time period, respective portions of the power-based bandwidth budget among the plurality of local bandwidth regulation circuits. A particular one of the plurality of local bandwidth regulation circuits may be configured to determine, for a second time period that is shorter than the first time period, a local bandwidth forecast using respective estimated bandwidth needs received from a respective subset of network switching circuits, and to allocate, using the local bandwidth forecast, a respective portion of the power-based bandwidth budget across the respective subset of network switching circuits.

The circuits and techniques described above in regards to FIGS. 1-7 may be performed using a variety of methods. Two methods associated with operation of a bandwidth regulation circuit are described below in regards to FIGS. 8 and 9.

Turning now to FIG. 8, a flow diagram for an embodiment of a method for regulating power of a communication network using a bandwidth regulation circuit is illustrated. Method 800 may be used in conjunction with any of the computer circuitry, systems, devices, elements, or components disclosed herein, such as SoCs 100, 400, and 500 of FIGS. 1, 4, and 5. In some embodiments, some or all of the operations of method 800 may be performed using instructions included in a non-transitory, computer-readable storage medium having program, the instructions being executable by a processing circuit in SoCs 100, 400, or 500 to cause the operations described with reference to FIG. 8. Method 800 is described below using SoC 100 of FIG. 1 as an example. References to elements in FIG. 1 are included as non-limiting examples.

As illustrated, method 800 begins in block 810 with a power management circuit in a system-on-chip (SoC) determining a network power budget based on a determined power consumption of the SoC. For example, power management circuit 105 may determine network power budget 150 based on a corresponding determined power consumption of SoC 100. In some embodiments, network power budget 150 may be estimated by cross-referencing current operating conditions with power consumption values that are based on prior evaluation of SoC 100 under various operating conditions. In other embodiments, one or more power sensing circuits may be used to determine a current power consumption of SoC 100. Network power budget 150 may be determined based on how much power is being consumed by other circuits in SoC 100. After network power budget 150 is determined for a given time window, power management circuit 105 may send a respective network power budget 150 to bandwidth regulation circuit 101.

In various embodiments, power management circuit 105 may determine a respective network power budget 150 at a particular time interval, in response to a change in power consumption of SoC 100, or a combination thereof. For example, power management circuit 105 may update values of network power budget 150 at the particular time interval. If a change in power consumption satisfies a particular threshold level of power in the middle of a particular time interval, then an additional update to network power budget 150 may be triggered. After an updated network power budget 150 is determined, power management circuit 105 may send a current value of network power budget 150 to bandwidth regulation circuit 101.

In some embodiments, one of the plurality of network switching circuits may be coupled to a different bandwidth regulation circuit on a different integrated circuit than the power management circuit. In such an embodiment, determining the network power budget is also based on a determined power consumption of the different integrated circuit. Referring to FIG. 5, for example, a global network power budget 550 may be determined after receiving an indication of a power consumption of IC 504b via D2D I/Fs 522.

Method 800 continues at block 820 with a bandwidth regulation circuit in the SoC, determining, for an upcoming time window, a power-based bandwidth budget using the network power budget. For example, bandwidth regulation circuit 101, may determine bandwidth budget 155 using a respective frequency of one or more network clock signals and/or a respective voltage level of one or more network power signals. An amount of power consumed by a single transaction may be estimated based on a clock frequency and power supply voltage level in the communication network. Accordingly, bandwidth budget 155 may be estimated by dividing network power budget 150 with the single transaction estimate, thereby calculating how many data transactions 140 may be performed within network power budget 150.

At block 830, method 800 continues with a particular one of a plurality of network switching circuits, coupled to a communication network in the SoC, estimating a bandwidth need for data transactions during the upcoming time window. For example, network switching circuits 114 may generate respective estimated bandwidth needs 145 based on an estimated number of data transactions 140 that a respective network switching circuit 114 will perform in an upcoming time window. For example, network switching circuit 114b may generate bandwidth need 145b based on a count of data transactions performed by each of agents 120b and 120c in one or more time windows that have recently completed.

Method 800 further continues at block 840 with the bandwidth regulation circuit determining, using received estimated bandwidth needs, a global bandwidth forecast for the communication network. Bandwidth regulation circuit 101 may, for example, use estimated bandwidth needs 145, received from network switching circuits 114, to determine global bandwidth forecast 160. In some embodiments, global bandwidth forecast 160 may be a summation of all received bandwidth needs 145. In other embodiments, bandwidth needs 145 may be scaled using a scaling factor that is based, e.g., on a current miss rate for each respective network switching circuit 114. Network switching circuit 114b may have a high miss rate that is indicative of BW need 145b being lower than a number of data transactions 140 that agents 120b and 120c have requested in recent time windows. Accordingly, a scaling factor, based on this miss rate, may be used to increase BW need 145b to mitigate the potential for future inaccurate forecasts from network switching circuit 114b.

Method 800, at block 850, continues with the bandwidth regulation circuit allocating, using the global bandwidth forecast and the power-based bandwidth budget, bandwidth to the plurality of network switching circuits for use during the upcoming time window. For example, bandwidth regulation circuit 101 may, using global bandwidth forecast 160 and bandwidth budget 155, allocate bandwidth budget 155 across network switching circuits 114. If global bandwidth forecast 160 is less than bandwidth budget 155, then each of network switching circuits 114 may be allocated all bandwidth that they estimated. In some embodiments, one or more of network switching circuits 114 may receive a larger allocation than estimated if there is a surplus in bandwidth budget 155. On the other hand, if there is a deficit in bandwidth budget 155, then bandwidth regulation circuit 101 may allocate less than the estimated bandwidth need 145 for one or more of network switching circuits 114. Any suitable technique may be used to allocate available bandwidth budget 155 among network switching circuits 114.

Power consumption of a communication network may be managed by estimating a network bandwidth need and then allocating a bandwidth budget based on how much of the bandwidth need can be performed within a given power consumption budget allocated to the network. The disclosed techniques may allow for greater performance of ones of the network switching circuits when a global bandwidth need is less than the determined budget. The technique may further provide protection against exceeding physical power supply limits if a bandwidth need exceeds an available bandwidth budget over one or more time windows.

It is noted that the method of FIG. 8 includes blocks 810-850. Method 800 may end in block 850 or may repeat some or all blocks of the method. For example, method 800 may return to block 810 to update a network power budget in response to a change to power consumption of the SoC. In some cases, blocks of method 800, or a portion thereof, may be performed concurrently with other blocks of the method. For example, blocks 810 and then 820 may be performed while blocks 830 and then 840 are being performed.

Proceeding now to FIG. 9, a flow diagram for an embodiment of a method for adjusting estimated bandwidth needs by a bandwidth regulation circuit is illustrated. Similar to method 800, method 900 may be used in conjunction with any of the computer circuitry, systems, devices, elements, or components disclosed herein, such as SoCs 100, 400, and 500. Some or all of the operations of method 900, in some embodiments, may be performed using instructions included in a non-transitory, computer-readable storage medium having program, the instructions being executable by a processing circuit in an SoC 100, 400, or 500 to cause the operations described with reference to FIG. 9. Method 900 is described below using FIGS. 1, 2, and 3 as example embodiments. References to elements in these figures are included as non-limiting examples. Some or all of method 900, in some embodiments, may be performed as a part of block 830 and/or block 840 of method 800, and may begin after an estimated bandwidth need has been determined by a particular network switching circuit.

As shown, method 900 begins in block 910 with the particular network switching circuit comparing the estimated bandwidth need to a minimum bandwidth request. For example, network switching circuit 114a may estimate BW need 145a using an average of data transactions sent over a series of preceding time windows. As shown in FIG. 2, network switching circuit 114a may, at time t3, determine that an average of seven transactions were initiated by agents 120a and 120j over the past three time windows and, therefore, use a value of seven as an initial value of BW need 145a. Network switching circuit 114a may then compare this initial value of BW need 145a to a current value of minimum BW 247. A value of minimum BW 247 may be set using a variety of strategies, such as setting a static value that does not change over time, or using a dynamic value that is based on a miss rate of prior estimated BW needs 145a.

At block 920, method 900 continues with the particular network switching circuit, in response to determining that the estimated bandwidth need is less than the minimum bandwidth request, providing the minimum bandwidth request in place of the estimated bandwidth need to the bandwidth regulation circuit. As shown in FIG. 2, a value of minimum BW 247, at time t3, is eight while the initial value of BW need 145a is seven. Accordingly, network switching circuit 114a adjust the value of BW need 145a from seven to eight, and sends this value to bandwidth regulation circuit 101.

Method 900 further proceeds at block 930 with a bandwidth regulation circuit adjusting, using a scaling factor, the estimated bandwidth need received from the particular network switching circuit, wherein the scaling factor is associated with the particular network switching circuit. For example, network switching circuit 114a may send the value of eight as BW need 145a. Bandwidth regulation circuit 101 receives this value of BW need 145a and may further adjust using scale factor 348, which may have a current value of '1.2.' A resulting adjusted BW need of '9.6' may be rounded up to ten, and used to determine global bandwidth forecast 160.

At block 940, method 900 continues with the bandwidth regulation circuit adjusting the scaling factor based on a determined accuracy of previous estimated bandwidth needs received from the particular network switching circuit. In some embodiments, bandwidth regulation circuit 101 may track a miss rate for each of network switching circuits 114. In other embodiments, network switching circuits 114 may track their respective miss rates and provide this information to bandwidth regulation circuit 101. In either embodiment, bandwidth regulation circuit 101 may use a miss rate, and/or a recent trend of miss rates to determine a respective scale factor for each network switching circuit 114. If network switching circuit 114a estimates too small of a bandwidth, then the respective scale factor may be increased to allot more bandwidth for upcoming time windows than network switching circuit 114a requests. In contrast, if network switching circuit 114a request too much bandwidth that goes unused, then the respective scale factor may be decreased to reduce chances of bandwidth going unused by network switching circuit 114a in an upcoming time window.

It is noted that method 900 includes blocks 910-940. Method 900 may end in block 940 or may repeat some or all blocks of the method. Although network switching circuit 114a is described as performing operations of blocks 910 and 920, and bandwidth regulation circuit 101 is described as performing operations of blocks 930 and 940, it is contemplated that either network switching circuit 114a or bandwidth regulation circuit 101 may perform operations of either, or both, sets of blocks. Furthermore, in some embodiments, blocks 930 and 940 may be skipped if the minimum bandwidth value is greater than an estimated bandwidth value. In other embodiments, blocks 910 and 920, or blocks 930 and 940, may be omitted from method 900.

Figure 10:
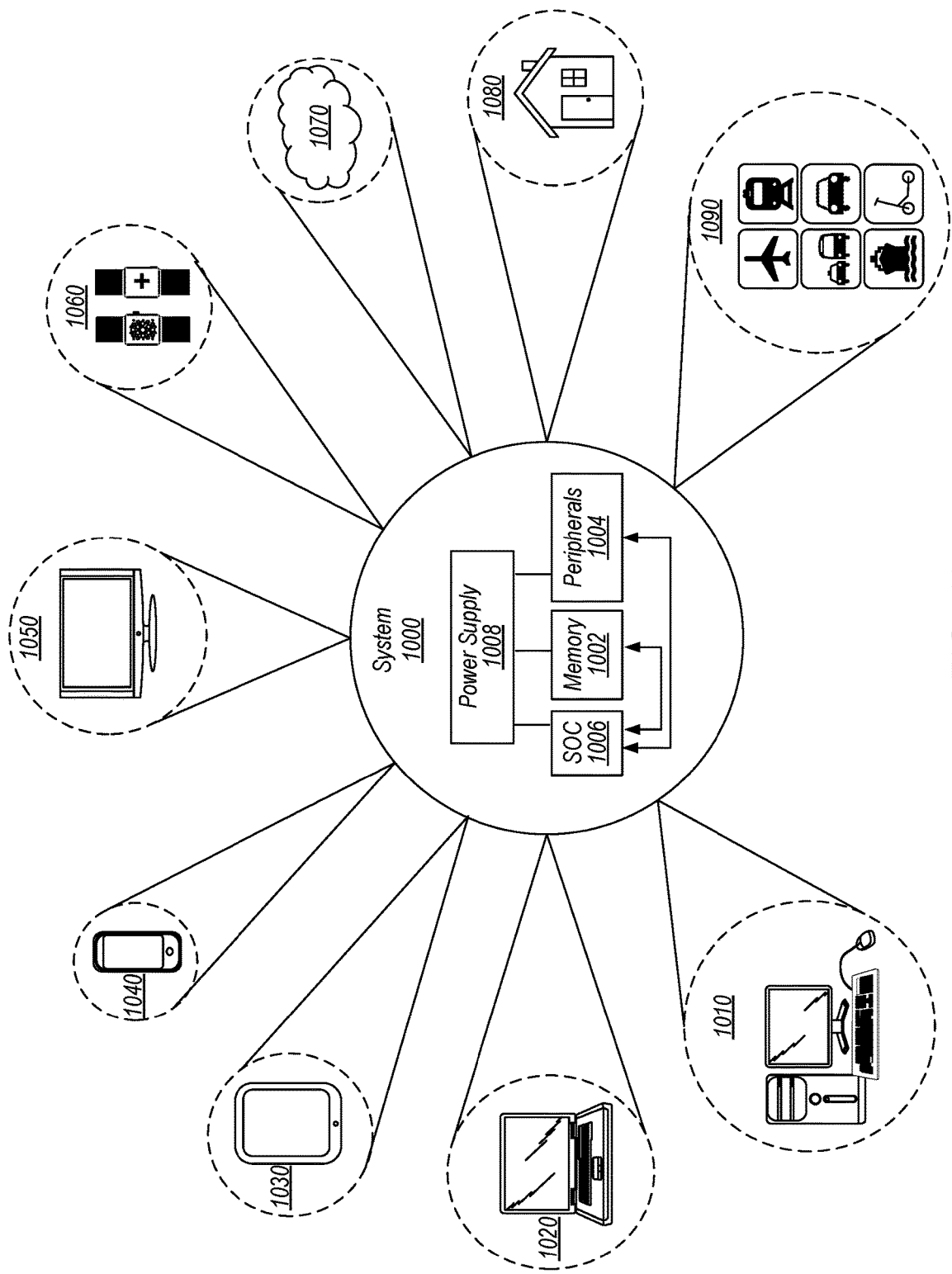
FIG. 10 shows various embodiments of systems that include integrated circuits that utilize the disclosed techniques.

FIGS. 1-9 illustrate circuits and methods for an SoC, including one or more integrated circuits, that includes a bandwidth regulation circuit in one or more of the integrated circuits. Any embodiment of the disclosed SoCs may be included in one or more of a variety of computer systems, such as a desktop computer, laptop computer, smartphone, tablet, wearable device, and the like. A block diagram illustrating an embodiment of computer system 1000 is illustrated in FIG. 10. SoC 1006 may, in some embodiments, correspond to any disclosed embodiment of SoCs 100, 400, and 500 in FIGS. 1, 4, and 5.

In the illustrated embodiment, the system 1000 includes at least one instance of a system on chip (SoC) 1006 which may include multiple types of processor circuits, such as a central processing unit (CPU), a graphics processing unit (GPU), or otherwise, a communication fabric, and interfaces to memories and input/output devices. One or more of these processor circuits may correspond to an instance of the processor cores disclosed herein. In various embodiments, SoC 1006 is coupled to external memory circuit 1002, peripherals 1004, and power supply 1008.

A power supply 1008 is also provided which supplies the supply voltages to SoC 1006 as well as one or more supply voltages to external memory circuit 1002 and/or the peripherals 1004. In various embodiments, power supply 1008 represents a battery (e.g., a rechargeable battery in a smart phone, laptop or tablet computer, or other device). In some embodiments, more than one instance of SoC 1006 is included (and more than one external memory circuit 1002 is included as well).

External memory circuit 1002 is any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 1002 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multi-touch display screens, keyboard or other input devices, microphones, speakers, etc.

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 1060 are contemplated as well, such as devices worn around the neck, devices attached to hats or other headgear, devices that are implantable in the human body, eyeglasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home 1080 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise.

It is noted that the wide variety of potential applications for system 1000 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 10 are illustrative only and are not intended to be limiting. Other devices are possible and are contemplated.

As disclosed in regards to FIG. 10, computer system 1000 may include one or more integrated circuits included within a personal computer, smart phone, tablet computer, or other type of computing device. A process for designing and producing an integrated circuit using design information is presented below in FIG. 11.

Figure 11:
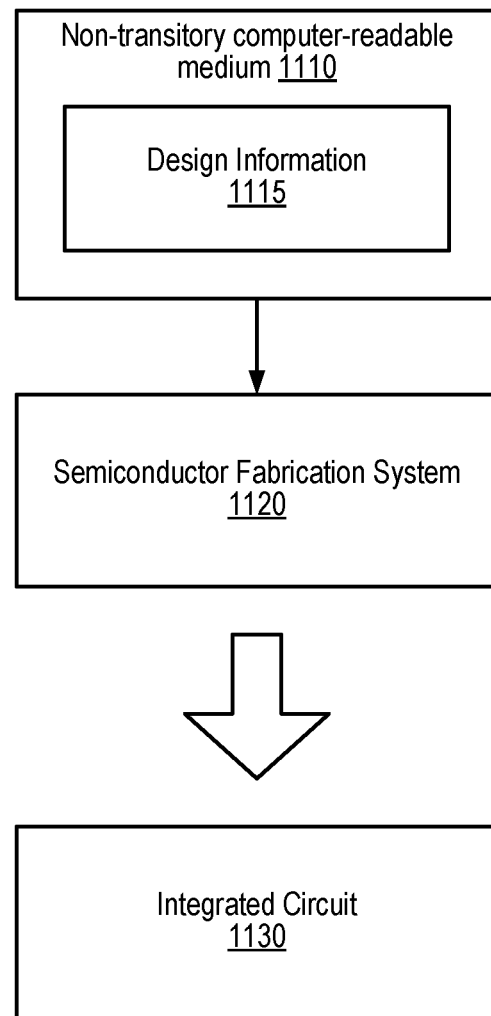
FIG. 11 is a block diagram of an example computer-readable medium, according to some embodiments.

FIG. 11 is a block diagram illustrating an example of a non-transitory computer-readable storage medium that stores circuit design information, according to some embodiments. The embodiment of FIG. 11 may be utilized in a process to design and manufacture hardware integrated circuits, for example, including one or more instances of SoCs 100, 400, and 500 shown in FIGS. 1, 4, and 5. In the illustrated embodiment, semiconductor fabrication system 1120 is configured to process the design information 1115 stored on non-transitory computer-readable storage medium 1110 and fabricate hardware integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, System Verilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3)

both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
  a computer system implemented as a system-on-chip, the computer system including:
    a plurality of agent circuits configured to generate data transactions;
    a communication network configured to transfer data transactions between two or more agent circuits of the plurality of agent circuits;
    a plurality of network switching circuits coupled to the plurality of agent circuits and to the communication network, wherein a particular one of the plurality of network switching circuits is configured to estimate a bandwidth need for data transactions to be sent via the particular network switching circuit in an upcoming time window; and
    a bandwidth regulation circuit configured to moderate power consumption of the communication network, wherein to moderate the power consumption the bandwidth regulation circuit is configured to:
      based on a frequency of a network clock signal and a voltage level of a network power signal, determine a power-based bandwidth budget using a network power budget for the upcoming time window;
      using estimated bandwidth needs received from the plurality of network switching circuits, determine a global bandwidth forecast; and
      allocate, using the global bandwidth forecast for the upcoming time window, the power-based bandwidth budget among the plurality of network switching circuits; and
    wherein the plurality of network switching circuits are further configured to send the data transactions based on the allocation.

2. The apparatus of claim 1, wherein the computer system further includes a power management circuit configured to:
  determine, at a predetermined time interval, respective network power budgets based on corresponding determined power consumptions of the computer system; and
  send, at the predetermined time interval, the respective network power budgets to the bandwidth regulation circuit.

3. The apparatus of claim 1, wherein the computer system further includes a power management circuit configured to:
  in response to a change in power consumption of the computer system that satisfies a threshold level, determine an updated network power budget based on the change in power consumption; and
  send the updated network power budget to the bandwidth regulation circuit.

4. The apparatus of claim 1, wherein the particular network switching circuit is further configured to:
  track a number of data transactions sent by the particular network switching circuit over a time window; and
  estimate the bandwidth need using a rolling average of data transactions sent over a series of preceding time windows; and
  wherein the bandwidth regulation circuit is further configured to allocate the power-based bandwidth budget for a next time window.

5. The apparatus of claim 1, wherein the computer system is implemented as the system-on-chip on a plurality of co-packaged integrated circuit dies.

6. The apparatus of claim 5, wherein at least one of the plurality of network switching circuits is included on a different integrated circuit die of the plurality of co-packaged integrated circuit dies than the bandwidth regulation circuit.

7. The apparatus of claim 1, wherein the particular network switching circuit is further configured to track a number of forecast misses, wherein a forecast miss occurs when a given estimated bandwidth need is lower than a corresponding actual bandwidth used.

8. The apparatus of claim 7, wherein the particular network switching circuit is further configured to:
determine a scaling factor based on the number of forecast misses; and
adjust a next estimated bandwidth need using the scaling factor.

9. The apparatus of claim 1, wherein the particular network switching circuit is further configured to:
in response to a determination that the estimated bandwidth need is less than a minimum bandwidth request, send the minimum bandwidth request as the estimated bandwidth need to the bandwidth regulation circuit.

10. The apparatus of claim 1, wherein the bandwidth regulation circuit includes:
a plurality of local bandwidth regulation circuits coupled to respective subsets of the plurality of network switching circuits; and
a global bandwidth regulation circuit configured to allocate, for a first time period, respective portions of the power-based bandwidth budget among the plurality of local bandwidth regulation circuits; and
wherein a particular local bandwidth regulation circuit of the plurality of local bandwidth regulation circuits is configured to:
determine, for a second time period that is shorter than the first time period, a local bandwidth forecast using respective estimated bandwidth needs received from a respective subset of network switching circuits; and
allocate, using the local bandwidth forecast, a respective portion of the power-based bandwidth budget across the respective subset of network switching circuits.

11. A method comprising:
determining, by a power management circuit in a computer system implemented as a system-on-chip, a network power budget based on a determined power consumption of the computer system;
determining, by a bandwidth regulation circuit in the computer system for an upcoming time window, a power-based bandwidth budget using the network power budget;
estimating, by a particular one of a plurality of network switching circuits coupled to a communication network in the computer system, a bandwidth need for data transactions during the upcoming time window;
in response to determining that a value of the estimated bandwidth need is less than a minimum bandwidth request, using, by the particular network switching circuit, the minimum bandwidth request as the value of the estimated bandwidth need;
determining, by the bandwidth regulation circuit using received estimated bandwidth needs, a global bandwidth forecast for the communication network;
allocating, by the bandwidth regulation circuit using the global bandwidth forecast and the power-based bandwidth budget, bandwidth to the plurality of network switching circuits for use during the upcoming time window; and
sending, by the particular network switching circuit, the data transactions based on the allocation during the upcoming time window.

12. The method of claim 11, further comprising:
adjusting, by the bandwidth regulation circuit using a scaling factor, the estimated bandwidth need received from the particular network switching circuit, wherein the scaling factor is associated with the particular network switching circuit; and
adjusting, by the bandwidth regulation circuit, the scaling factor based on a determined accuracy of previous estimated bandwidth needs received from the particular network switching circuit.

13. The method of claim 11, wherein one of the plurality of network switching circuits is coupled to a different bandwidth regulation circuit on a different integrated circuit than the power management circuit; and
wherein determining, by the power management circuit in the computer system, the network power budget includes determining the network power budget based on a determined power consumption of the different integrated circuit.

14. The method of claim 11, wherein estimating the bandwidth need for data transactions during the upcoming time window includes estimating, by the particular network switching circuit, the bandwidth need using a rolling average of data transactions sent over a series of preceding time windows.

15. A system comprising:
a first integrated circuit including:
a first communication network;
a first plurality of network switching circuits coupled to the first communication network; and
a first bandwidth regulation circuit configured to determine, for the first plurality of network switching circuits, a first bandwidth forecast using respective estimated bandwidth needs received from the first plurality of network switching circuits; and
a second integrated circuit including:
a power management circuit configured to determine a global network power budget based on operating conditions of the first and second integrated circuits;
a second communication network coupled to the first communication network;
a second plurality of network switching circuits coupled to the second communication network; and
a second bandwidth regulation circuit configured to:
determine a power-based bandwidth budget using the global network power budget;
determine, for the second plurality of network switching circuits, a second bandwidth forecast using respective estimated bandwidth needs received from the second plurality of network switching circuits; and
allocate, using the first and second bandwidth forecasts, the power-based bandwidth budget across the first and second pluralities of network switching circuits; and
wherein the first and second pluralities of network switching circuits are configured to perform data transactions based on the allocation.

16. The system of claim 15, wherein the second bandwidth regulation circuit includes:
a plurality of local bandwidth regulation circuits, including the first bandwidth regulation circuit, wherein a subset of the plurality of local bandwidth regulation circuits are coupled to respective subsets of the second plurality of network switching circuits; and
a global bandwidth regulation circuit configured to allocate, for a first time period, respective portions of the power-based bandwidth budget among the first and second pluralities of local bandwidth regulation circuits.

17. The system of claim 16, wherein a particular local bandwidth regulation circuit of the plurality of local bandwidth regulation circuits is configured to:
- determine, for a second time period that is shorter than the first time period, a local bandwidth forecast using respective estimated bandwidth needs received from a respective subset of the second plurality of network switching circuits; and
- allocate, using the local bandwidth forecast, a respective portion of the power-based bandwidth budget across the respective subset of the second plurality of network switching circuits.

18. The system of claim 15, wherein the second integrated circuit includes a plurality of agent circuits, and wherein ones of the second plurality of network switching circuits are respectively coupled to one or more of the plurality of agent circuits.

19. The system of claim 18, wherein a particular one of plurality of agent circuits is a second die-to-die interface coupled a first die-to-die interface in the first integrated circuit, and wherein the first and second die-to-die interfaces are configured to transmit information across the first and second communication networks.

20. The system of claim 19, wherein a particular one of the second plurality of network switching circuits is coupled to the second die-to-die interface, and is configured to determine an estimated bandwidth need for transferring information between the first and second die-to-die interfaces.

* * * * *